US009485159B1

(12) United States Patent
Sant'Anna et al.

(10) Patent No.: US 9,485,159 B1
(45) Date of Patent: Nov. 1, 2016

(54) RULES-BASED NETWORK SERVICE MANAGEMENT WITH ON-DEMAND DEPENDENCY INSERTION

(71) Applicant: Juniper Networks, Inc., Sunnyvale, CA (US)

(72) Inventors: Paulo Sant'Anna, Sunnyvale, CA (US); Jian Jin, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 880 days.

(21) Appl. No.: 13/717,578

(22) Filed: Dec. 17, 2012

(51) Int. Cl.
*G06F 15/16* (2006.01)
*H04L 12/26* (2006.01)
*H04L 29/08* (2006.01)
*H04L 29/06* (2006.01)

(52) U.S. Cl.
CPC ............. *H04L 43/08* (2013.01); *H04L 29/06* (2013.01); *H04L 29/08072* (2013.01); *H04L 29/08117* (2013.01)

(58) Field of Classification Search
CPC ............ H04L 29/08072; H04L 29/06; H04L 29/0809
USPC ........................................................ 709/219
See application file for complete search history.

(56) References Cited

U.S. PATENT DOCUMENTS

| | | | | |
|---|---|---|---|---|
| 7,885,925 B1* | 2/2011 | Strong | ............... | G06F 17/30038 707/620 |
| 8,270,310 B2* | 9/2012 | Raleigh | ............ | G06Q 10/06375 370/252 |
| 2002/0138449 A1* | 9/2002 | Kendall | ............... | G06Q 10/063 705/75 |
| 2003/0005112 A1* | 1/2003 | Krautkremer | ....... | H04L 41/0213 709/224 |
| 2005/0050228 A1* | 3/2005 | Perham | ............... | G06F 17/2247 709/246 |
| 2006/0047379 A1* | 3/2006 | Schullian | ............ | B61L 27/0077 701/19 |
| 2008/0119132 A1* | 5/2008 | Rao | ........ | G06Q 30/02 455/3.04 |
| 2008/0196102 A1* | 8/2008 | Roesch | .................... | G06F 21/55 726/23 |
| 2009/0144364 A1* | 6/2009 | Krishnan | ............... | G06Q 10/06 709/203 |
| 2009/0150548 A1* | 6/2009 | Smith | ................. | H04L 41/0893 709/226 |
| 2009/0327179 A1* | 12/2009 | Strassner | ............ | H04L 41/5003 706/14 |
| 2010/0007738 A1* | 1/2010 | Lehnert | ................... | H04N 7/181 348/159 |
| 2010/0058165 A1* | 3/2010 | Bhattacharya | ...... | H04L 63/1416 715/227 |
| 2010/0063903 A1* | 3/2010 | Whipple | ................. | G06Q 20/40 705/30 |
| 2010/0150122 A1* | 6/2010 | Berger | ..................... | H04W 4/02 370/338 |
| 2010/0188975 A1* | 7/2010 | Raleigh | ............ | G06Q 10/06375 370/230.1 |
| 2012/0041921 A1* | 2/2012 | Canaday | ........... | G06F 17/30507 707/607 |
| 2013/0226320 A1* | 8/2013 | Berg-Sonne | ........... | G05B 15/02 700/90 |

OTHER PUBLICATIONS

Ralph Jeffery, "Drools Performance Comparison >> Illation LTD," Retrieved from http://blogs.illation.com/2009/07/drools-performance-comparison/, Jul. 22, 2009, 9 pp.

* cited by examiner

*Primary Examiner* — Razu A Miah
(74) *Attorney, Agent, or Firm* — Shumaker & Sieffert, P.A.

(57) ABSTRACT

Techniques are described for managing network services deployed in a network using a rules engine with on-demand dependency insertion. A network service manager may use a rules engine to monitor a network service at network devices in order to detect a device-level event, and determine a service-level impact of the detected event based on network service rules and dependencies. The dependencies define links between the device-level event and actions triggered by the device-level event. According to the techniques, a rules engine is configured to detect a device-level event and, in response, insert only those dependencies associated with the detected device-level event into a working memory. Once the device-level event has been cleared, the dependencies related to the device-level event are removed from the working memory. The working memory, therefore, will include only the dependencies needed to determine service-level impacts of currently detected device-level events.

32 Claims, 7 Drawing Sheets

RULES-BASED NETWORK SERVICE MANAGEMENT WITH ON-DEMAND DEPENDENCY INSERTION

TECHNICAL FIELD

The invention relates to computer networks and, more particularly, to management of network services for devices within the networks.

BACKGROUND

Network Service Providers (NSPs) typically provision network services, such as point-to-point, point-to-multi-point, and mesh services, across multiple network devices within a service provider network. The network services provide network connectivity to end-users, such as remotely located client sites of an enterprise system, through the service provider network. A NSP may deploy a network service manager having a rules engine to monitor the network services provided by the network devices in order to detect the occurrence of device-level events within the network, such as connectivity failures. Upon detecting a device-level event, the rules engine determines a service-level impact, e.g., a network-wide service failure, of the detected device-level event based on network service rules and dependencies. This allows the NSP to detect and respond to the detected device-level events.

In a typical configuration, the rules engine of the network service manager determines service-level actions, such as service-level alarms, by applying the rules to a data set of "dependencies" for the network. The data set of dependencies associated with a given network service is typically stored in a working memory of the rules engine during system initialization or when a service is provisioned. Dependencies, which are also referred to as "facts" herein, define relationships or links between the device-level events that may occur at each of the network devices and actions at higher-level entities triggered by the device-level events. As the service provider network expands to include more network devices and provision additional network services, the data set of dependencies for the network increases in size to capture all the relationships.

SUMMARY

In general, techniques are described for managing network services deployed in a network using a rules engine with on-demand dependency insertion. A network service manager may use a rules engine to monitor a network service at a network device in order to detect the occurrence of events, and, upon detecting a device-level event, determine a service-level impact of the detected event based on network service rules and dependencies. The dependencies define links between the device-level event and actions triggered by the device-level event. Thus, rather than load a complete data set of dependencies associated with the network service for the entire network into a working memory of the rules engine at system initialization or when provisioning the service, the techniques may be applied to only insert facts and their dependencies that are related to incoming events. As the processing speed of the rules engine decreases linearly with the increasing size of the data set to be evaluated in the working memory, the techniques may result into memory conservation and increased processing speed.

According to example techniques of this disclosure, a rules engine is configured to detect a device-level event and, in response, insert only those dependencies associated with the detected device-level event into the working memory. In this way, the dependencies are inserted into the working memory of the rules engine "on-demand" as needed. Once the device-level event has been cleared, e.g., a connectivity failure is resolved, the dependencies related to the device-level event are removed from the working memory. The working memory, therefore, will include the dependencies needed to determine service-level impacts of currently detected device-level events without slowing down the processing speed of the rules engine.

In one example, the disclosure is directed to a method comprising monitoring, with a rules engine, a network service at one or more network devices in a network to detect a device-level event, upon detecting the device-level event, inserting a data set of dependencies associated with the device-level event into a working memory, wherein the data set of dependencies inserted in the working memory comprises a subset of a plurality of dependencies for the network service, and wherein the data set of dependencies defines links between the device-level event and actions triggered by the device-level event, and applying, with the rules engine, a set of network service rules to the data set of dependencies inserted in the working memory to determine a service-level impact of the detected device-level event.

In another example, the disclosure is directed to a network service manager device for a network comprising a working memory, and a processor configured to execute a rules engine to monitor a network service at one or more network devices in the network to detect a device-level event, upon detecting the device-level event, insert a data set of dependencies associated with the device-level event into the working memory, wherein the data set of dependencies inserted in the working memory comprises a subset of a plurality of dependencies for the network service, and wherein the data set of dependencies defines links between the device-level event and actions triggered by the device-level event, and apply a set of network service rules to the data set of dependencies inserted in the working memory to determine a service-level impact of the detected device-level event.

In a further example, the disclosure is directed to a computer-readable medium comprising instructions that when executed cause a processor of a network service manager device to monitor a network service at one or more network devices in a network to detect a device-level event, upon detecting the device-level event, inserting a data set of dependencies for the device-level event into a working memory, wherein the data set of dependencies inserted in the working memory comprises a subset of a plurality of dependencies for the network service, and wherein the data set of dependencies defines links between the device-level event and actions triggered by the device-level event, and applying a set of network service rules to the data set of dependencies inserted in the working memory to determine a service-level impact of the detected device-level event.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
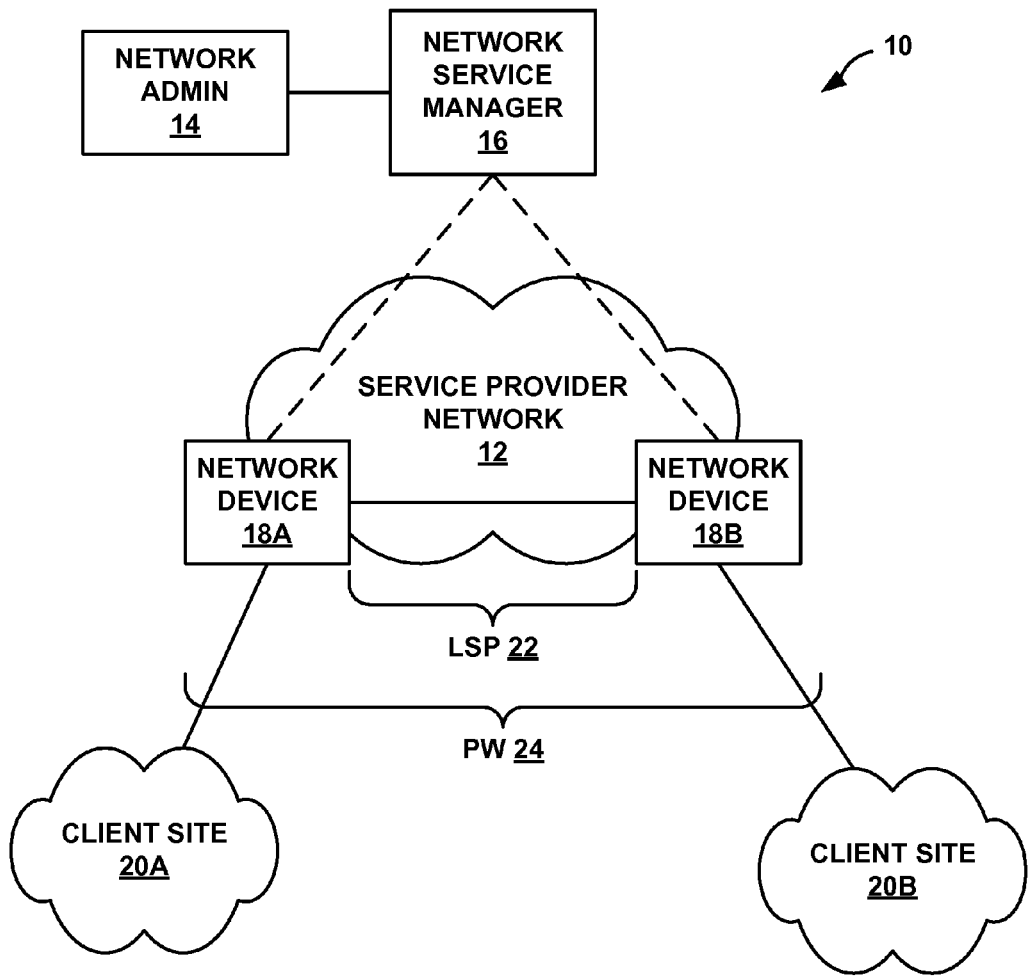
FIG. 1 is an example network system including a service provider network and a network service manager capable of managing a network service of the service provider network according to the techniques of this disclosure.

FIG. 1 is an example network system 10 including a service provider network 12 and a network service manager 16 capable of managing a network service of service provider network 12 according to the techniques of this disclosure. In the illustrated example, network service manager 16 provisions network services, such as point-to-point, point-to-multipoint, and mesh service, across two or more network devices 18A and 18B ("network devices 18") within service provider network 12. The network services provide network connectivity to end-users included in client sites 20A and 20B ("client sites 20") through network 12.

Although not illustrated in FIG. 1, service provider network 12 may be coupled to one or more networks administered by other service providers, and may thus form part of a large-scale public network infrastructure, e.g., the Internet. Consequently, client sites 20 may be viewed as edge networks of the Internet. The network services provisioned across network devices 18 in network 12 enable computing devices within client sites 20 to access to the Internet, and may also allow the computing devices within client sites 20 to communicate with one another.

Network devices 18 may comprise routers, switches or other appliances configured to provide client sites 20 with access to network 12. In some examples, network device 18 may comprise provider edge (PE) routers of network 12. In the illustrated embodiment, network device 18A is coupled to client site 20A and network device 18B is coupled to client site 20B. Client sites 20 may be networks for geographically separated sites of an enterprise. Each of client sites 20 may include one or more computing devices (not shown), such as personal computers, laptop computers, handheld computers, workstations, servers, switches, printers, or other devices.

The configuration of network 10 illustrated in FIG. 1 is merely exemplary. For example, service provider network 12 may include a variety of network devices other than network devices 18, such as other routers, switches, servers, security appliances, wireless access points, and the like. As another example, service provider network 12 may be coupled to any number of client sites 20 included in a given enterprise, or any number of additional clients sites that may be stand-alone networks or included in other enterprises.

Network service manager 16 provisions and monitors network services in service provider network 12. The network services may be point-to-point, point-to-multipoint, or mesh versions of several different service types. For example, in the transport layer (L2), the service type may be a virtual local area network (VLAN). In this case, network service manager 16 may establish pseudowire (PW) 24 between client sites 20 across network devices 18. PW 24 may be used to emulate the transmission of L2 traffic, e.g., Ethernet frames or ATM cells, across a L3 packet-switched network such as network 12. In the network layer (L3), the service type may be a virtual private network (VPN). In this case, network service manager 16 may establish label switched path (LSP) 24 between network devices 18. LSP 22 may be used to transmit L3 traffic, e.g., IP packets, across network 12.

As illustrated in FIG. 1, a network administrator 14 communicates with network service manager 16 to define or modify the network services within network 12. Network administrator 14 may interact with network service manager 16 via a user interface, e.g., a command line interface (CLI), presented by network service manager 16. Additionally, network administrator 14 may interact with network service manager 16 in other ways, such as a user interface presented by either network administrator 14 or network service manager 16.

In some examples, network service manager 16 may comprise a stand-alone appliance that provides a network management platform on which to execute a network service application that provisions and monitors the network services of network 12. In other examples, network service manager 16 may comprise a generic appliance that executes a virtual instance of the network management platform on which to execute the network service application that provisions and monitors the network services of network 12.

Network service manager 16 monitors the provisioned network service at network devices 18 in order to detect the occurrence of device-level events, such as connectivity failures or recoveries of LSP 22 or PW 24. Upon detecting a device-level event, network service manager 16 may use a rules engine to determine an impact on the network service from the detected device-level event based on network service rules and dependencies. Dependencies may be referred to as "facts" that define relationships or links between the device-level events that may occur at each of network devices 18 and actions at high-level entities triggered by the device-level events. Network service manager 16 may then notify end-users at client sites 20 of the determined service-level impact.

Conventionally, a data set of dependencies associated with each network service for the entirety of network 12 is stored in a working memory of the rules engine used by network service manager 16. As network 12 expands to include more network devices and additional network services, the data sets inserted in the working memory will increase in size to capture all the relationships. The processing speed of the rules engine, however, decreases linearly with the increasing size of the data sets to be evaluated in the working memory.

The techniques of this disclosure enable network service manager 16 to manage the network services deployed in network 12 using a rules engine with on-demand dependency insertion. More specifically, a rules engine used by network service manager 16 is configured to detect a device-level event and, in response, insert only those dependencies related to the detected device-level event into the working memory. In this way, the dependencies are inserted into the working memory of the rules engine "on-demand" as needed. Once the device-level event has been cleared or resolved, the dependencies related to the device-level event are removed from the working memory. The working memory, therefore, will include the dependencies needed to determine service-level impacts of currently detected device-level events without slowing down the processing speed of the rules engine.

Figure 2:
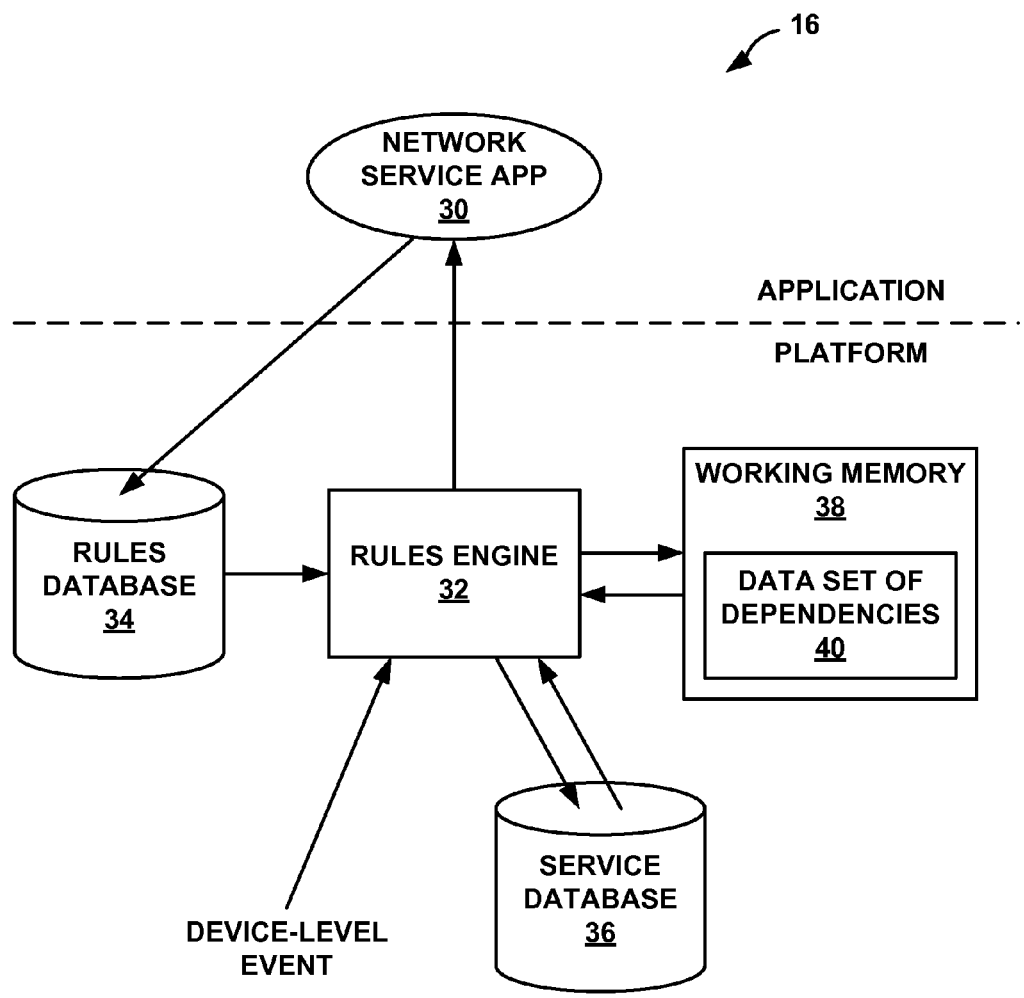
FIG. 2 is a block diagram illustrating an exemplary network service manager capable of determining a service-level impact of a device-level event in a network with a rules engine using on-demand dependency insertion in accordance with the techniques of this disclosure.

FIG. 2 is a block diagram illustrating an example of network service manager 16 from FIG. 1 capable of determining a service-level impact of a device-level event in network 12 with a rules engine 32 using on-demand dependency insertion in accordance with the techniques of this disclosure. Network service manager 16 provides a network management platform and an application operating environment that runs on the platform. Network service manager 16 executes a network service application 30 in the application operating environment. Network administrator 14 from FIG. 1 interacts with network service application 30 to configure the network services. In addition, network service application 30 interacts with a rules engine 32 and related databases in the network management platform to monitor provisioned network services in network 12 and generate appropriate network service notifications to end-users in client sites 20.

Upon installation of network service application 30 in the application operating environment of network service manager 16, network service application 30 installs network service rules for a given network service into rules database 34. Network service application 30 then provisions the network service across network devices 18 in network 12. Network service application 30 provisions the network service by configuring network devices 18 to establish device-level connections that form the network service, such as LSP 22 and PW 24 from FIG. 1. Configuring network devices 18 for the network service may include configuring logical interfaces and other network elements of network devices 18. The configuration of the provisioned network service, including a plurality of relationships or dependencies between different network elements associated with the network service, is then stored in service database 36.

In the example illustrated in FIG. 2, the network management platform includes rules engine 32, a rules database 34, a service database 36, and a working memory 38 that stores a data set of dependencies 40. In general, rules engine 32 is configured to make business logic decisions by evaluating a given set of facts or dependencies stored in working memory 38 based on a set of rules stored in rules database 34 to determine an outcome. In the case of network service management described in this disclosure, network service manager 16 uses rules engine 32 to monitor the provisioned network service at network devices 18. More specifically, rules engine 32 monitors network devices 18 to detect the occurrence of device-level events related to the connectivity of the network service. For example, rules engine 32 monitors network devices 18 detect a failure of an interface for LSP 22 or PW 24. When rules engine 32 detects a device-level event, rules engine 32 evaluates dependencies for the device-level event in working memory 38 using network service rules in rules database 34 to determine a service-level impact of the device-level event.

Rules engine 32 uses three components to determine the service-level impact of the detected device-level event. First, rules engine 32 uses network service rules in rules database 34 to derive new facts about the provisioned network service in network 12 based on known facts. The network service rules are static and part of the system. Second, rules engine 32 uses dependencies in working memory 38 to define which device-level events will impact which network services provisioned in network 12. Third, when a device-level event is detected in network 12, rules engine 32 uses runtime event processing to apply the network service rules to the dependencies in working memory 38 to determine the service-level impact and generate service-level notifications.

Conventionally, all the dependencies for a given system are inserted into working memory 38 at the time when the system is initialized, e.g., when the network service is provisioned in network 12. The size of the data set in working memory 38 is an important factor in the performance of rules engine 32 because processing speed of rules engine 32 decreases linearly with the size of the data set to be evaluated. In the case of large, complex, and highly-interconnected systems, such as network services in network 12, the sheer number of dependencies stored in working memory 38 will significantly decrease the processing speed of rules engine 32.

To enable high-speed processing even for complex network services, the techniques of this disclosure provide on-demand dependency insertion into working memory 38. More specifically, rules engine 32 is configured to detect a device-level event at one of network devices 18 and, in response, insert a data set of dependencies 40 associated with the detected device-level event that includes only a subset of the dependencies associated with the network service into working memory 38. In addition, once the device-level event has been cleared or resolved, rules engine 32 removes data set of dependencies 40 related to the device-level event from working memory 38. In this way, working memory 38 will include only the dependencies needed to determine service-level impacts of currently detected device-level events without slowing down the processing speed of rules engine 32.

For example, when rules engine 32 detects a device-level event, rules engine 32 queries service database 36 to retrieve the dependencies associated with the detected device-level event from the plurality of dependencies associated with the network service stored in service database 36. Rules engine 32 then inserts data set of dependencies 40 including the dependencies retrieved from service database 36 for the device-level event into working memory 38. Rules engine 32 may perform the on-demand dependency insertion techniques by building dependency trees in working memory 38 that are rooted at the detected device-level event with multiple levels of dependencies that define links to one or more service-level impacts of the device-level event.

Figure 5:
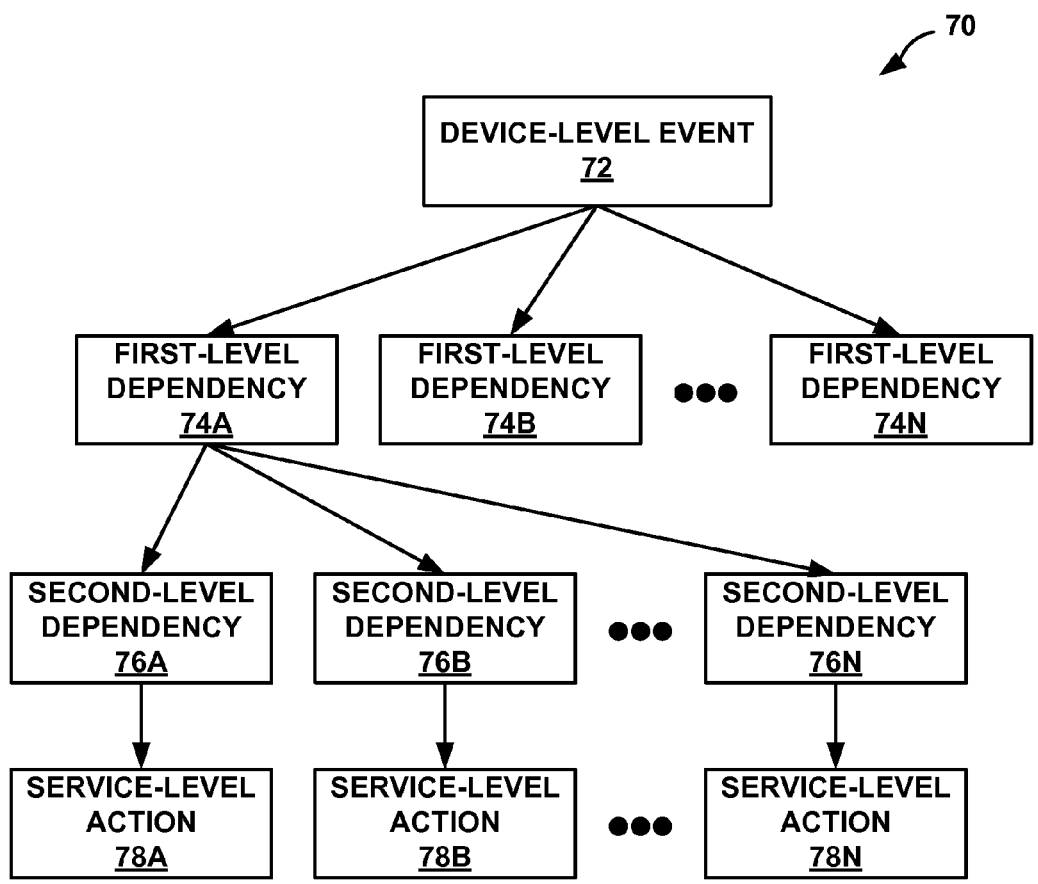
FIG. 5 is a conceptual diagram illustrating an exemplary multi-level dependency tree including a hierarchy of dependencies linking a particular network device-level event to multiple potential service-level actions triggered by the device-level event.

More specifically, when a device-level event is detected, rules engine 32 inserts a set of first-level dependencies that are directly linked to the device-level event into working memory 38. Next, for each of first-level dependencies, rules engine 32 inserts a set of second-level dependencies that are directly linked to the particular first-level dependency. Rules engine 32 may progressively insert addition levels of dependencies into working memory 38 until reaching a dependency that is directly linked to a service-level action triggered by the device-level event. This process is not only an efficient way to load the dependencies into working memory 38, but also serves as a correlation mechanism used to determine a service-level impact from a detected device-level event. In some cases, the dependency trees may be pre-built by a mechanism external to rules engine 32 and stored in service database 36 or another relational database accessible by rules engine 32. An example dependency tree is illustrated in FIG. 5 below.

In some cases, one or more dependencies loaded for a first detected device-level event may also be linked to a second detected device-level event. In this case, instead of loading a separate dependency tree for the second device-level event, rules engine 32 may insert a subset of dependencies for the second device-level event that are not linked to the first device-level event into working memory 38. This subset of dependencies may comprise a branch of the dependency tree previously loaded for the first device-level event. In this way, rules engine 32 only loads the new dependencies for each subsequently detected device-level events into working memory 38, and does not load duplicate dependencies into working memory 38. In the case where multiple device-level events share the same dependencies and trigger the same service-level action, the first detected device-level event comprises the root of the dependency tree and is the device-level event that triggers the corresponding service-level action.

After data set of dependencies 40 for the detected device-level event is inserted into working memory 38, rules engine 32 determines a service-level impact of the device-level event based on the dependencies in working memory 38 and the network service rules in rules database 34. As an example, rules engine 32 applies the network service rules to the dependency tree to determine a path along the dependency tree associated with the detected device-level event to one of the service-level actions.

As described above, rules engine 32 uses three components to determine the service-level impact of a detected device-level event. These components are now described in more detail with respect to the different types of rules used by rules engine 32: event mapping rules, impact propagation rules, and dependency mapping rules. The event mapping rules match the detected device-level events to the network devices at which the events occurred. For example, the event mapping rules match an incoming event by looking up the event in rules database 34 to find the matching component, and then insert a component fact into working memory 38, e.g. an interface for LSP 22 at network device 18A is down.

The impact propagation rules provide a propagation scheme based on the component match loaded on the previous step so that the dependencies associated with the device-level event can be loaded into working memory 38. The impact propagation rules act to both load and remove dependencies on-demand from working memory 38. More specifically, the impact propagation rules trigger the loading of needed dependencies into working memory 38 when a component is considered down, e.g. dependencies needed for the failed LSP interface at network device 18A, and the impact propagation rules also trigger the removal of dependencies when the component comes back up.

The dependency mapping rules actually look up the dependencies in service database 36, load then into working memory 38, and create depends-on facts that state the dependency between components, e.g., an interface for PW 24 at network device 18A depends on the interface for LSP 22 at network device 18 A. By inserting and removing the component facts, the dependency needed facts and the depends-on facts, rules engine 32 has the proper rules to evaluate the loaded dependencies and determine the correct service-level impacts.

A service-level impact may comprise a network-wide change to the network service, such as a failure of the network service across network devices 18 in network 12, due to the device-level event. For example, if the device-level event is a failure of LSP 22 at network device 18A, the service-level impact may be the failure of the L3 VPN network service in network 12. Rules engine 32 then performs the triggered service-level action to generate a notification of the determined service-level impact to network service application 30. In response to this notification, network service application 30 may notify end-users at client sites 20 of the impending disruption to the network service or may reconfigure the network service in network 12 to avoid the service-level failure.

A first detected device-level event may be cleared or resolved by a second detected device-level event. For example, the first device-level event may be a failure of LSP 22 at network device 18A, which causes the network service to go down. The second device-level event may comprise a recovery of LSP 22 at network device 18A, which causes the network service to come back into operation.

When the first event clears, rules engine 32 removes data set of dependencies 40 for the first device-level event from working memory 38. More specifically, dependencies in the dependency tree for the first device-level event are traversed and removed, as long as the dependencies are not linked to the second device-level event or other pending device-level events. In this way, data set of dependencies 40 for the first device-level event is only stored in working memory 38 when needed to determine the service-level impact of the first detected device-level event and removed when the dependencies are no longer needed.

In the case where the first device-level event shares one or more dependencies with other pending device-level events, rules engine 32 will maintain the shared dependencies that are linked to the other pending device-level events even after the first device-level event has been cleared. When the other pending device-level events are cleared, rules engine 32 will then remove the dependencies for the other device-level events and any remaining shared dependencies for the first device-level event from working memory 38.

In some cases, after the first device-level event is cleared, rules engine 32 maintains one or more dependencies for the first device-level event in working memory 32 that are not linked to any other pending events. These currently unneeded dependencies may be maintained in working memory 38 to avoid frequent insertion and removal operations between service database 36 and working memory 38. This may occur due to instability of the system or simply due to characteristics of the network service. In some examples, rules engine 32 may define a threshold capacity for working memory 38. In this case, when the threshold capacity is reached and too many dependencies are loaded into working memory 38, rules engine 32 may first identify these unneeded dependencies for removal from working memory 38. Rules engine 32 may remove the unneeded dependencies from working memory 38 according to a time-out mechanism or a first-in, first-out (FIFO) mechanism.

Although not illustrated in FIG. 2, network administrator 14 may interact with network service manager 16 via a CLI, which provides a shell by which network administrator 14 may modify the configuration of network services provisioned by network service manager 16 using text-based commands. For example, network administrator 14 may use telnet or secure shell (SSH) protocol from a remote device to access network service application 30 of network service manager 16 and invoke the CLI. In other embodiments, network administrator 14 may communicate with network service manager 16 via a user interface (not shown in FIG. 2) presented by either network administrator 14 or by network service manager 16.

In some cases, network administrator 14 modifies the configuration of the network service due to a topology change in network 12. The configuration of the network service is updated in service database 36. The techniques of this disclosure enable data set of dependencies 40 stored in working memory 38 to also be updated, independent of a detected device-level event, to reflect the topology change in network 12. The update only requires re-insertion of dependencies included in data set of dependencies 40 for currently pending device-level events. This is an improvement over conventional techniques that required the dependencies in the entire service database to be reloaded into working memory 38 when a change occurred. The smaller size of the data set to be reloaded reduces an amount of time that the facts in working memory 38 are out-of-sync with those in service database 36.

According to the techniques of this disclosure, by only loading the dependencies into working memory 38 that are necessary to determine the service-level impact of a given device-level event, rules engine 32 is able to perform at a higher level. In addition, network service application 30 is able to provision network services much faster due to the small amount of data that needs to be inserted into working memory 38 at initialization. Further, the techniques avoid or reduce times when dependencies stored in working memory 38 are out-of-sync with the service database 36 after a topology change to the network service. The small amount of time needed to load new dependencies on-demand upon receipt of a device-level event is outweighed by the time savings from the on-demand system described above. The benefits of the on-demand system are especially noticeable in large network deployments where the number of network services and associated dependencies can be very large.

The architecture of network service manager 16 illustrated in FIG. 2 is shown for exemplary purposes only. The disclosure is not limited to this architecture. In other examples, network device 20 may be configured in a variety of ways. In one example, the architecture of network service manager 16 may comprise a stand-alone appliance configured to provide the network management platform over which to execute network service application 30. The stand-alone appliance may be a physical appliance used solely for the network service management operations in network 12. In another example, the architecture of network service manager 16 may comprise a generic appliance configured to execute a virtual instance of the network management platform over which to execute network service application 30. In this case, the generic appliance may be a physical appliance executing multiple virtual instances to perform multiple different types of operations in network 12.

The network management platform of network service manager 16 includes hardware architecture and software framework that provides an application operating environment in which application software can run. For example, the network management platform of network service manager 16 may include one or more processors that execute software instructions. In that case, the application operating environment of network service manager 16 may include various software modules or applications, e.g., network service application 30, executing on the platform, and may include a non-transitory computer-readable storage device, such as computer memory or hard disk, for storing executable instructions.

A hardware environment of the network management platform of network service manager 16 may include a microprocessor (not shown in FIG. 2) that executes program instructions in order to execute both a kernel and the application operating environment. The microprocessor may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of network service manager 16, e.g., network service application 30. The application operating environment of network service manager 16, in some examples, retrieves and executes the instructions from memory for these aspects.

Figure 3:
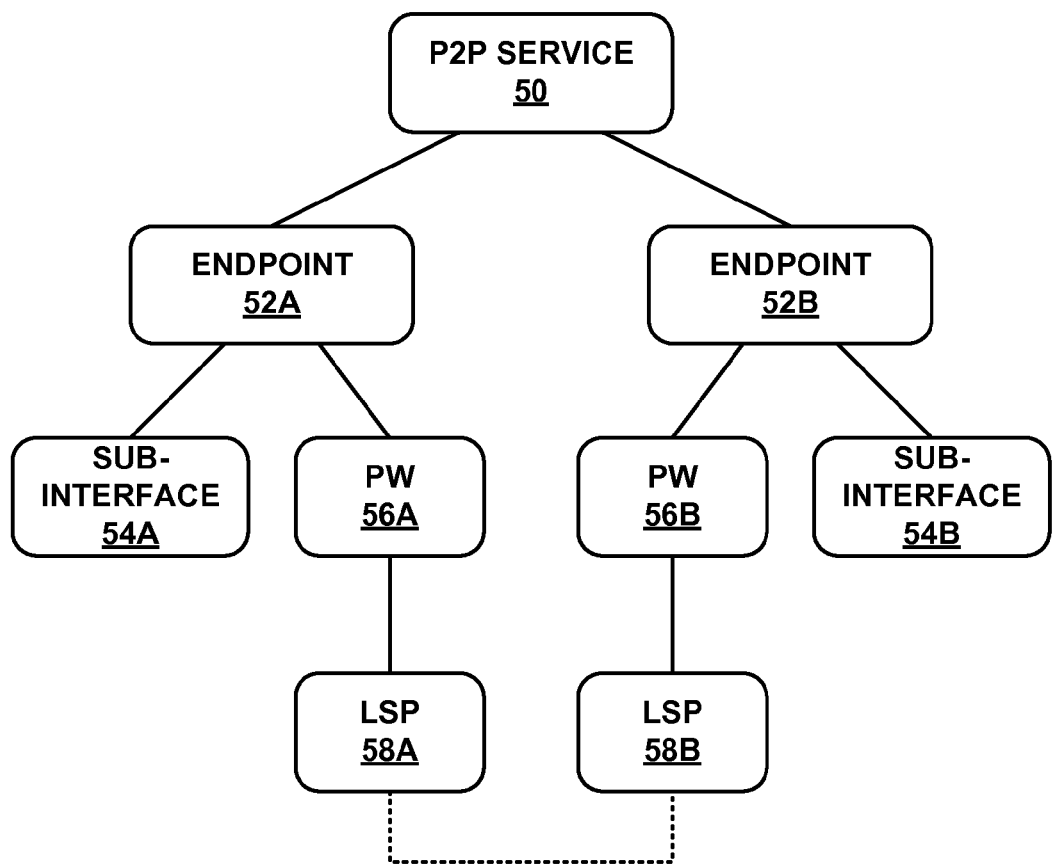
FIG. 3 is a conceptual diagram illustrating a point-to-point (P2P) service including two endpoints and several network elements providing connectivity to the endpoints.

FIG. 3 is a conceptual diagram illustrating a point-to-point (P2P) service 50 including two endpoints 52A-52B ("endpoints 52") and several network elements providing connectivity to endpoints 52. P2P service 50 is provisioned across network devices, such as network devices 18 in network 12, for a particular enterprise client to provide point-to-point connectivity to users at its remote client sites 20. In the example illustrated in FIG. 3, the connectivity of P2P service 50 includes a pseudowire (PW) and a label switched path (LSP) established between endpoints 52. Endpoints 52 may comprise ingress and egress network devices of network 12. For example, endpoints 52 may be network devices 18A and 18B at the edge of network 12 that connect to client sites 20 and connect to each other via LSP 22 and PW 24.

Endpoint 52A includes a logical sub-interface 54A and a PW interface 56A that provide connectivity to endpoint 52A as part of P2P service 50. PW interface 56A is associated with a LSP interface 58A. Similarly, endpoint 52B also includes a logical sub-interface 54B and a PW interface 56B that provide connectivity to endpoint 52B as part of P2P service 50. PW interface 56B is associated with a LSP interface 58B. Rules engine 32 may detect a device-level event at any of sub-interface 54A, PW 56A and LSP 58A of endpoint 52A, or sub-interface 54B, PW 56B and LSP 58B of endpoint 52B. Rules engine 32 may then evaluate the dependencies between the network elements using a set of network service rules to determine an impact of the device-level event on P2P service 50.

Figure 4:
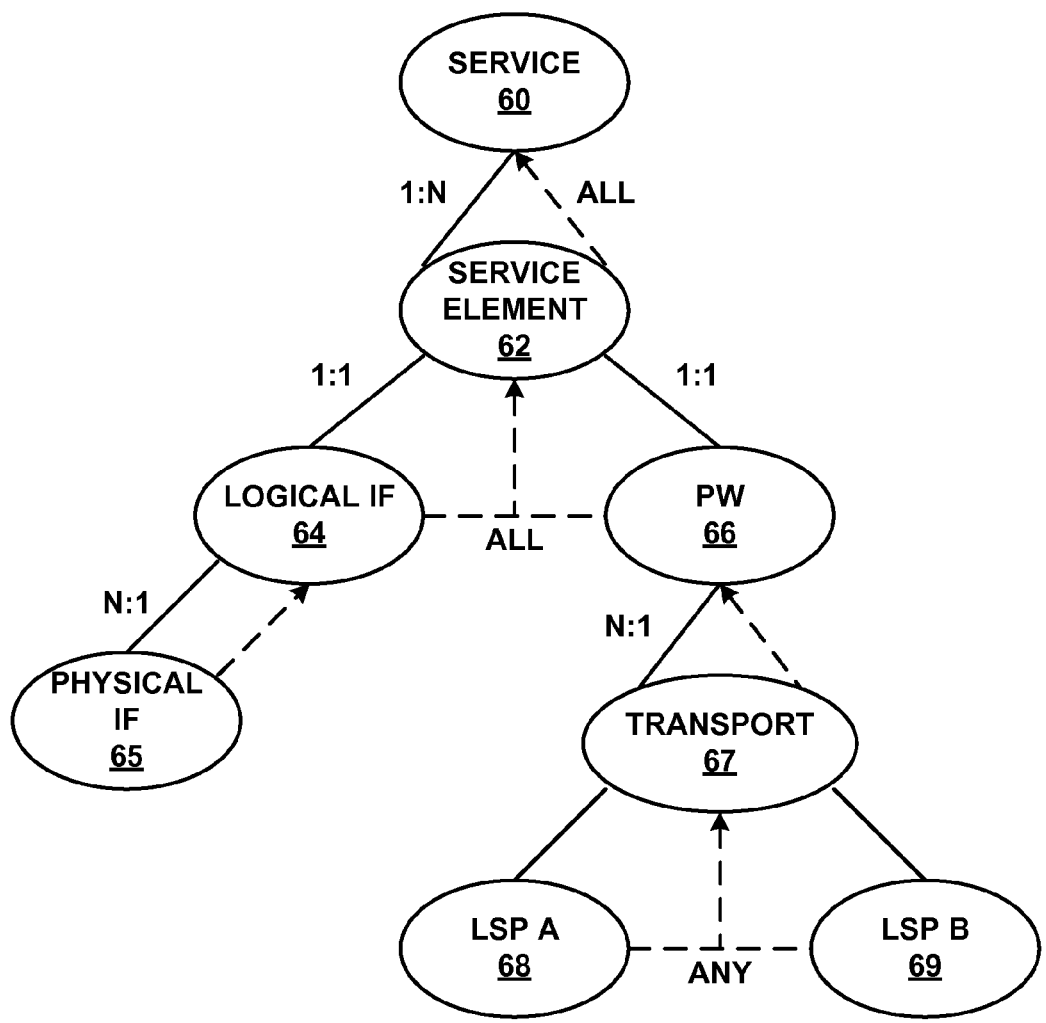
FIG. 4 is a conceptual diagram illustrating a hierarchical relationship between device-level entities from which the network service manager detects events, and service-level entities for which the network service manager generates event impact notifications.

FIG. 4 is a conceptual diagram illustrating a hierarchical relationship between device-level entities from which network service manager 16 detects events, and service-level entities for which network service manager 16 generates event impact notifications. The solid lines represent links between the different entities, and the dashed lines represent impacts on the different entities based on a device-level event.

Network service 60 may comprise a P2P service, a P2MP service, or a mesh service formed by connecting multiple service elements, such as service element 62, that are distributed across one or more network devices 18 in network 12. The link between service 60 and the service elements, including service element 62, is one to many (i.e., 1:N, wherein N is the number of service elements provisioned across network 12).

Service element 62 is associated with a network device, e.g., network device 18A, and is linked to a logical interface (logical IF) 64 and a pseudowire (PW) interface 66 at network device 18A. In addition, logical IF 64 is linked to a given physical interface (physical IF) 65 of network device 18A. The link between logical IF 64 and physical interface 65 is many to one (i.e., N:1, wherein N is the number of logical interfaces that are on physical interface 65 of network device 18A). Logical IF 64 and physical IF 65 each provide connectivity to network device 18A as part of network service 60. Events that occur at logical IF 64 and physical IF 65, such as a connectivity failure or recovery, are device-level detectable events. For example, the upstream impact of the device-level event of physical IF 65 going down is that all the logical interfaces, including logical IF 64, on physical IF 65 will also go down. When all the logical interfaces on physical IF 65 go down, all the service elements of service 60, including service element 62, go down. Finally, when all the service elements on service 60 go down, service 60 goes down.

Similarly, PW interface 66 is linked to a transport layer 67 of network device 18A. Transport layer 67 is, in turn, linked to LSP A interface 68 and LSP B interface 69 at network device 18A. The link between PW interface 66 and transport layer 67 is many to one (i.e., N:1, wherein N is the number of pseudowire interfaces on transport layer 67 of the network device). PW interface 66, LSP A interface 68 and LSP B interface 69 each provide connectivity to network device 18A as part of network service 60. Events that occur at PW interface 66, LSP A interface 68 and LSP B interface 69, such as a connectivity failure or recovery, are device-level detectable events. As an example, the upstream impact of the device-level event of LSP A interface 68 or LSP B interface 69 going down is that all transport layer 67 goes down. When transport layer 67 goes down, all pseudowire interfaces, including PW interface 66, on transport layer 67 will also go down. When all the pseudowire interfaces on transport layer 67 go down, all the service elements of service 60, including service element 62, go down. Finally, when all the service elements on service 60 go down, service 60 goes down.

FIG. 5 is a conceptual diagram illustrating an exemplary multi-level dependency tree 70 including a hierarchy of dependencies linking a particular device-level event 72 to multiple potential service-level actions 78A-78N ("service-level actions 78") of the device-level event. Dependencies are facts that define relationships or links between device-level events that may occur at each of network devices 18 and actions at higher-entities triggered by the device-level events.

According to the techniques of this disclosure, rules engine 32 inserts dependency tree 70 into working memory 38 upon detecting the occurrence of device-level event 72 at one of network devices 18. More specifically, when device-level event 72 is detected, rules engine 32 inserts a set of first-level dependencies 74A-74N ("first-level dependencies 74") that are directly linked to device-level event 72 into working memory 38. Next, for each of first-level dependencies 74, rules engine 32 inserts a set of second-level dependencies that are directly linked to the particular first-level dependency. In the illustrated example, rules engine 32 inserts a set of second-level dependencies 76A-76N ("second-level dependencies 76") that are directly linked to first-level dependency 74A. Each of the second-level dependencies 76 is, in turn, linked directly to one of service-level actions 78. Although not illustrated in FIG. 5, in other examples, each of first-level dependencies 74 may have a set of second-level dependencies that link the first-level dependency to potential service-level impacts. Additionally, in other examples, dependency tree 70 may include additional levels of dependencies, e.g., third-level dependencies and fourth-level dependencies, to link device-level event 72 to potential service-level actions.

In general, rules engine 32 evaluates dependency tree 70 for device-level event 72 using network service rules stored in rules database 34 to determine the service-level impact of device-level event 72. Rules engine 32 may determine a path along dependency tree 70 from device-level event 72 to one of service-level actions 78 based on the network service rules. As one example, device-level event 72 comprises a connectivity failure associated with LSP 22 that is detectable at network device 18A. The dependencies loaded for device-level event 72 define relationships between LSP 22 at network device 18A and actions triggered by device-level event 72 at other network elements up to the network service.

In this example, first-level dependency 74A defines the impact of the failure of LSP 22 on PW 24 at network device 18A. Based on the network service rules, rules engine 32 determines whether PW 24 will also go down based on the failure of LSP 22 at network device 18A. If PW 24 fails as a result of device-level event 72, second-level dependency 76A defines the impact of the failure of LSP 22 and PW 24 on network device 18A. Based on the network service rules, rules engine 32 determines whether network device 18A will also go down based on the failure of LSP 22 and PW 24 at network device 18A. If network device 18A fails as a result of the failure of both LSP 22 and PW 24, service-layer action 78A comprises a failure of the network service in network 12. In response to service-layer action 78A, rules engine 32 generates a "service down" notification to network service application 30.

Dependency tree 70 may be removed from working memory 38 using a reverse process in which it is inserted into working memory 38. For example, when device-level event 72 has been cleared or resolved, rules engine 32 may first determine whether first-level dependency 74A has any second-level dependencies 76 that are linked to other pending device-level events. Rules engine 32 will maintain any of second-level dependencies 76 that are linked to pending device-level events, and remove those of second-level dependencies 76 that are not linked to pending device-level events. Rules engine 32 then performs the same check on first-level dependencies 74 that do not have pending second-level dependencies. For example, if rules engine 32 maintains pending second-level dependency 76A in working memory 38, then rules engine 32 will also maintain first-level dependency 74A to keep the pending dependency branch intact. If none of second-level dependencies 76 remain pending, rules engine 32 will remove all of second-level dependencies 76 from working memory 38 and may remove or maintain first-level dependency 74A based on whether that dependency is linked to any other pending device-level events.

Figure 6:
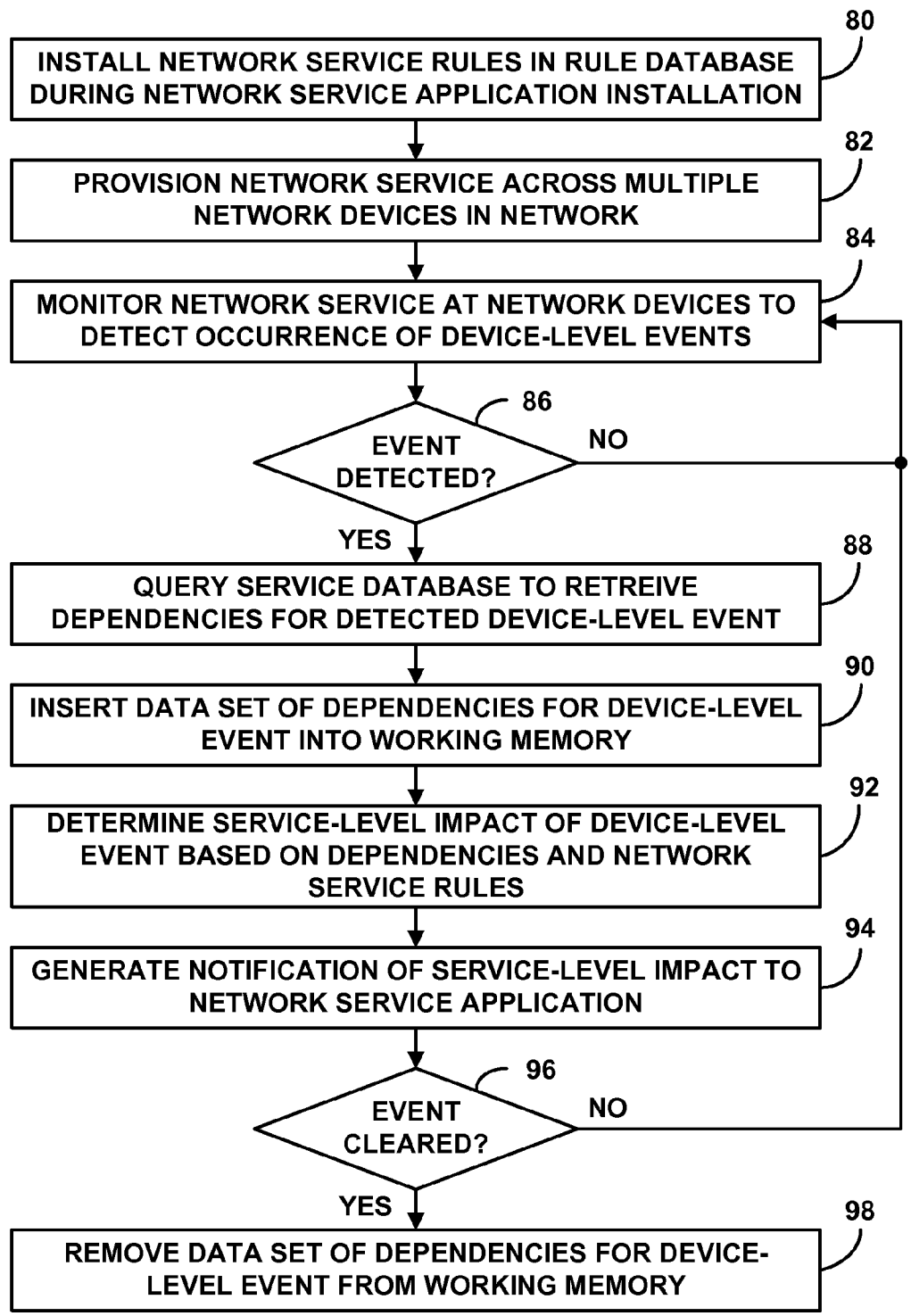
FIG. 6 is a flowchart illustrating an exemplary operation of determining a service-level impact of a device-level event in a network with a rules engine using on-demand dependency insertion.

FIG. 6 is a flowchart illustrating an exemplary operation of determining a service-level impact of a device-level event in network 12 with a rules engine 32 using on-demand dependency insertion. The example operation is described with respect to rules engine 32 of network service manager 16 from FIGS. 1 and 2. As illustrated in FIG. 2, network service manager 16 comprises a network service application 30 executed on a network management platform of either a stand-alone physical appliance or a virtual appliance.

Network service application 30 installs network service rules in rules database 34 during the installation time of network service application 30 (80). Network service application 30 then provisions a network service across multiple network devices 18 in network 12 (82). As described above, the provisioned network service may comprise a point-to-point (P2P), point-to-multipoint (P2MP), or mesh service across network devices 18 to provide connectivity to client sites 20 through network 12. More specifically, the network service may comprise an L3 VPN or an L2 VLAN.

Once the network service is provisioned, rules engine 32 monitors the network service at network devices 18 to detect the occurrence of any device-level events (84). A device-level event may comprise changes to the network service that are detectable at a network device, such as a connectivity failure between network devices 18. For example, if the network service comprises an L3 VPN, a device-level event may comprise a failure of a LSP at network device 18A in the VPN.

Until a device-level event is detected (86), rules engine 32 continuously monitors the network service at network devices 18 (84). Once rules engine 32 detects a device-level event from one of network devices 18 (YES branch of 86), rules engine 32 queries service database 36 to retrieve dependencies associated with the detected device-level event from the plurality of dependencies associate with the network service (88). Rules engine 32 inserts data set of dependencies 40 retrieved from service database 36 for the device-level event into working memory 38 (90). In this way, data set of dependencies 40 is inserted into working memory 38 "on-demand" as needed to determine a service-level impact of the currently detected device-level event. Data set of dependencies 40 includes a dependency tree rooted at the detected device-level event with multiple levels of dependencies that define links to one or more service-level actions triggered by the device-level event. An example dependency tree is illustrated in FIG. 5 above.

Rules engine 32 then determines a service-level impact of the device-level event based on data set of dependencies 40 in working memory 38 and the network service rules in rules database 34 (92). More specifically, rules engine 32 determines a path along the dependency tree of data set of dependencies 40 to one of the service-level actions by evaluating the levels of dependencies with the network service rules. A service-level impact may comprise a network-wide change to the network service, such as a failure of the network service across network devices 18 in network 12, due to the device-level event. For example, if the device-level event is a failure of LSP 22 at network device 18A, the service-level impact may be the failure of the L3 VPN network service in network 12. Rules engine 32 then perform the triggered action to generate a notification of the service-level impact to network service application 30 (94). In response to this notification, network service application 30 may notify customers at client sites 20 of the impending disruption to the network service or may reconfigure the network service to avoid the service-level failure.

Until the device-level event is cleared or resolved (96), rules engine 32 continues to monitor the network service at network devices 18 to detect additional device-level events (84). A device-level event may be cleared when a second device-level event is detected that resolves the first device-level event. For example, if the first device-level event is a failure of LSP 22 at network device 18A, the second device-level event may be reestablishment of LSP 22 by either rerouting the LSP using neighboring or backup network devices or correcting a connectivity issue at network device 18A.

When the device-level event has been cleared (YES branch of 96), rules engine 32 removes data set of dependencies 40 for the device-level event from working memory 38 (98). More specifically, dependencies in the dependency tree for the device level event are traversed and removed, as long as the dependencies are not linked to other pending device-level events. In this way, data set of dependencies 40 is only stored in working memory 38 when needed to determine the service-level impact of the detected device-level event and removed when the dependencies are no longer needed. The techniques of this disclosure, therefore, enable rules engine 32 to determine service-level impacts of currently detected device-level events without slowing down the processing speed with a large data set in working memory 38.

Figure 7:
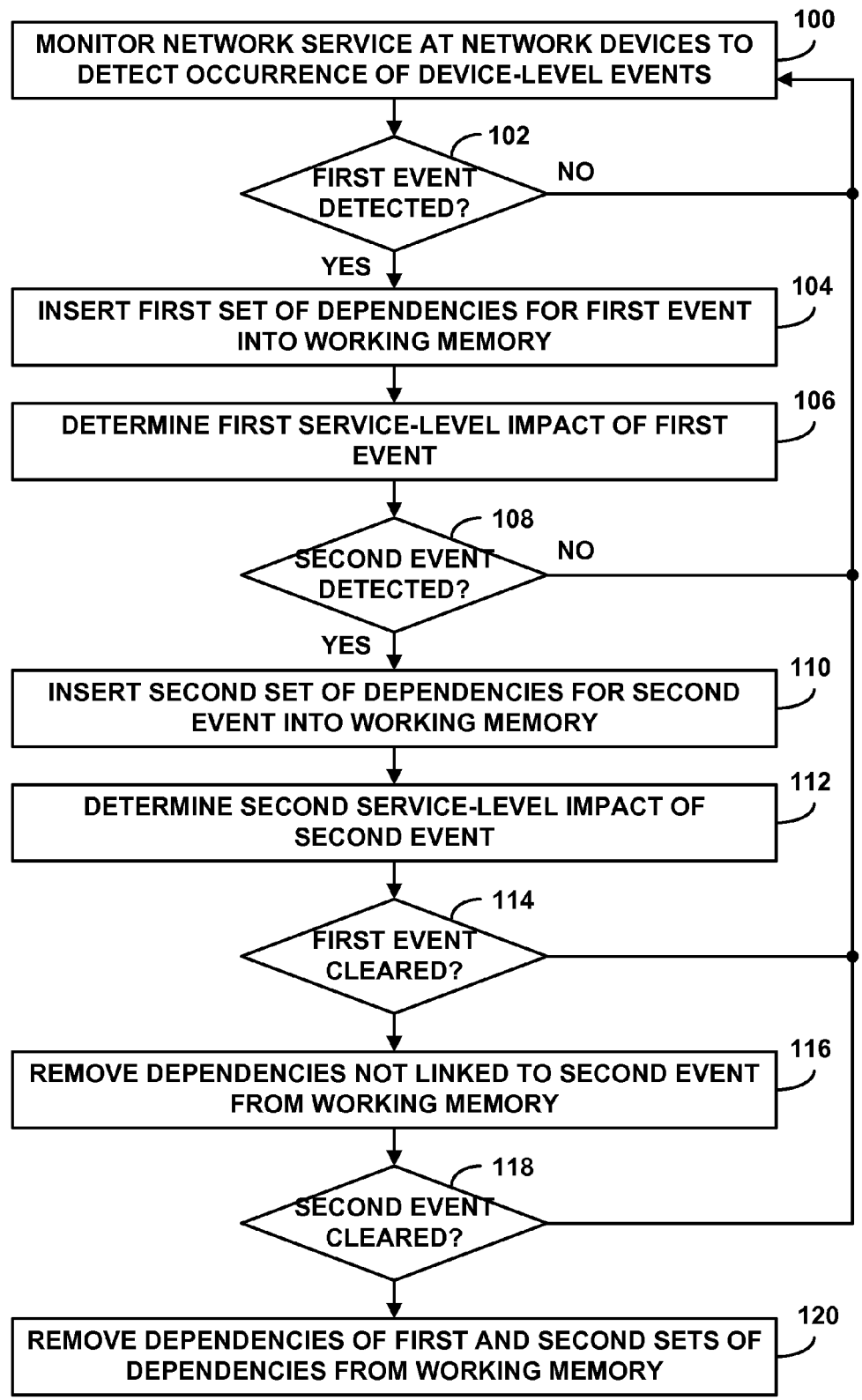
FIG. 7 is a flowchart illustrating an exemplary operation of managing on-demand insertion of dependencies into a working memory of a rules engine for multiple detected device-level events.

FIG. 7 is a flowchart illustrating an exemplary operation of managing on-demand insertion of dependencies into working memory 38 of rules engine 32 for multiple detected device-level events. The example operation is described with respect to rules engine 32 of network service manager 16 from FIGS. 1 and 2. As illustrated in FIG. 2, network service manager 16 comprises a network service application 30 executed on a network management platform of either a stand-alone physical appliance or a virtual appliance.

Rules engine 32 monitors a network service in network 12 at network devices 18 to detect the occurrence of any device-level events (100). Until a first device-level event is detected (102), rules engine 32 continuously monitors the network service at network devices 18 (100). Once rules engine 32 detects a first device-level event from one of network devices 18 (YES branch of 102), rules engine 32 inserts a first data set of dependencies retrieved from service database 36 for the first device-level event into working memory 38 (104). Rules engine 32 then determines a first service-level impact of the first device-level event based on the first data set of dependencies in working memory 38 and the network service rules in rules database 34 (106).

Until a second device-level event is detected (108), rules engine 32 continuously monitors the network service at network devices 18 (100). Once rules engine 32 detects a second device-level event from one of network devices 18 (YES branch of 108), rules engine 32 inserts a second data set of dependencies retrieved from service database 36 for the second device-level event into working memory 38 (110). The second data set of dependencies may include one or more dependencies from the first data set of dependencies. In this case, rules engine 32 may insert a subset of the second data set of dependencies that includes dependencies for the second device-level event that are not already included in the first data set of dependencies into working memory 38. In this way, working memory 38 does not include duplicate entries for dependencies that are linked to more than one detected device-level event. Rules engine 32 then determines a second service-level impact of the second device-level event based on the second data set of dependencies in working memory 38 and the network service rules in rules database 34 (112).

In some examples, the second device-level event detected by rules engine 32 may clear or resolve the first device-level event. Until the first device-level event is cleared (114), rules engine 32 continues to monitor the network service at network devices 18 to detect additional device-level events (100). When the first device-level event has been cleared (YES branch of 114), rules engine 32 removes dependencies of the first data set of dependencies for the first device-level event that are not linked to the second device-level event from working memory 38 (116). As described above, the first device-level event and the second device-level event may share some dependencies included in the first data set of dependencies. In this case, after the first device-level event is cleared, rules engine 32 will maintain the dependencies of the first data set of dependencies that are linked to the second device-level event.

In some examples, the second device-level event detected by rules engine 32 may be cleared or resolved by an additional device-level event, or by the completion of the second device-level event, e.g., restoring connectivity between network devices 18. Until the second device-level event is cleared (118), rules engine 32 continues to monitor the network service at network devices 18 to detect additional device-level events (100). When the second device-level event has been cleared (YES branch of 118), rules engine 32 removes dependencies of the second data set of dependencies for the second device-level event and any remaining dependencies of the first data set of dependences from working memory 38 (120). For example, as described above, rules engine 32 may maintain dependencies of the first data set of dependencies that are linked to the second device-level event in working memory 38 even after the first device-level event has been cleared. Once the second device-level event is cleared, rules engine 32 can remove the dependencies of both the first and second data sets of dependencies from working memory 38, assuming that none of the dependencies are linked to any other detected device-level events.

In some cases, after both the first and second device-level events have been cleared, rules engine 32 maintains one or more dependencies of the first and second data sets of dependencies in working memory 32. As one example, some dependencies may be maintained if they are linked to other detected device-level events. As another example, some dependencies may be maintained to avoid frequent insertion and removal operations between service database 36 and working memory 38. In this case, the maintained dependencies may later be removed from working memory 38 according to a time-out mechanism or a first-in, first-out (FIFO) mechanism.

Various examples have been described. These and other examples are within the scope of the following claims.

The invention claimed is:

1. A method comprising:
   monitoring, with a rules engine, a network service at one or more network devices in a network to detect a device-level event;
   in response to detecting a first device-level event, inserting a first data set of dependencies associated with the first device-level event into a working memory, wherein the first data set of dependencies inserted in the working memory comprises a first subset of a plurality of dependencies for the network service, and wherein the first data set of dependencies defines links between the first device-level event and actions triggered by the first device-level event;
   applying, with the rules engine, a set of network service rules to the first data set of dependencies inserted in the working memory to determine a first service-level impact of the detected first device-level event;
   in response to detecting a second device-level event, inserting a second data set of dependencies associated with the second device-level event into the working memory, wherein the second data set of dependencies inserted in the working memory comprises a second subset of the plurality of dependencies for the network service; and
   applying, with the rules engine, the set of network service rules to the second data set of dependencies inserted in the working memory to determine a second service-level impact of the second device-level event.

2. The method of claim 1, further comprising, upon detecting the first device-level event, querying a service database to retrieve the first data set of dependencies associated with the first device-level event from the plurality of dependencies for the network service.

3. The method of claim 1, wherein inserting the first data set of dependencies associated with the first device-level event comprises:
   inserting one or more first-level dependencies directly linked to the first device-level event into the working memory; and
   for each of the first-level dependencies, inserting one or more second-level dependencies directly linked to the first-level dependency into the working memory.

4. The method of claim 1, wherein inserting the first data set of dependencies associated with the first device-level event comprises inserting a dependency tree rooted at the device-level event into the working memory, wherein the dependency tree includes levels of dependencies that define the links to actions triggered by the first device-level event.

5. The method of claim 4, wherein applying the set of network service rules to the first data set of dependencies to determine the first service-level impact of the first device-level event comprises applying the set of network service rules to the dependency tree to determine a path along the dependency tree to a service-level action triggered by the first device-level event.

6. The method of claim 1, further comprising generating a notification of the first service-level impact of the first device-level event to a network service application.

7. The method of claim 1, further comprising, when the first device-level event is cleared, removing the first data set of dependencies associated with the first device-level event from the working memory.

8. The method of claim 1, wherein, when the second data set of dependencies includes one or more dependencies from the first data set of dependencies, inserting the second data set of dependencies comprises inserting a subset of the second data set of dependencies into the working memory, wherein the subset includes dependencies for the second device-level event that are not in the first data set of dependencies.

9. The method of claim 1, further comprising, when the first device-level event is cleared, removing one or more dependencies of the first data set of dependencies from the working memory, wherein the removed dependencies are not linked to any other detected device-level events.

10. The method of claim 1, further comprising, when the first device-level event and second device-level event are cleared:
    removing one or more dependencies of the first data set of dependencies and the second data set of dependencies from the working memory; and
    maintaining at least one dependency of the first data set of dependencies and the second data set of dependencies in the working memory.

11. The method of claim 10, further comprising removing the at least one maintained dependency of the first data set of dependencies and the second data set of dependencies according to one of a time-out mechanism or a first-in, first-out (FIFO) mechanism.

12. The method of claim 1, wherein the first device-level event comprises a connectivity failure between a first network device and a second network device, and wherein the first service-level impact of the first device-level event comprises a failure of the network service in the network.

13. The method of claim 1, further comprising:
upon installation of a network service application in a network service manager, installing the set of network service rules into a rules database of the rules engine; and
provisioning, with the network service application, the network service across the one or more network devices in the network.

14. The method of claim 1, wherein the network service comprises one of a point-to-point service, a point-to-multi-point service, or a mesh service across the one or more network devices.

15. The method of claim 1, wherein the network service comprises one of a virtual private network (VPN) or a virtual local area network (VLAN) across the one or more network devices.

16. A network service manager device for a network comprising:
a working memory; and
a processor configured to execute a rules engine to monitor a network service at one or more network devices in the network to detect a device-level event,
wherein the processor is configured to, in response to detecting a first device-level event, insert a first data set of dependencies associated with the first device-level event into the working memory, wherein the first data set of dependencies inserted in the working memory comprises a first subset of a plurality of dependencies for the network service, and wherein the first data set of dependencies defines links between the first device-level event and actions triggered by the first device-level event,
wherein the processor is configured to apply a set of network service rules to the first data set of dependencies inserted in the working memory to determine a first service-level impact of the detected first device-level event,
wherein the processor is configured to, in response to detecting a second device-level event, insert a second data set of dependencies associated with the second device-level event into the working memory, wherein the second data set of dependencies inserted in the working memory comprises a second subset of the plurality of dependencies for the network service, and
wherein the processor is configured to apply the set of network service rules to the second data set of dependences inserted in the working memory to determine a second service-level impact of the second device-level event.

17. The device of claim 16, wherein the processor is configured to execute the rules engine within a virtual instance.

18. The device of claim 16, further comprising a service database that stores the plurality of dependencies for the network service, wherein, upon detecting the first device-level event, the rules engine queries the service database to retrieve the first data set of dependencies associated with the first device-level event from the plurality of dependencies for the network service.

19. The device of claim 16, wherein the rules engine inserts one or more first-level dependencies directly linked to the first device-level event into the working memory, and, for each of the first-level dependencies, inserts one or more second-level dependencies directly linked to the first-level dependency into the working memory.

20. The device of claim 16, wherein the rules engine inserts a dependency tree rooted at the first device-level event into the working memory, wherein the dependency tree includes levels of dependencies that define the links to actions triggered by the first device-level event.

21. The device of claim 20, wherein the rules engine applies the set of network service rules to the dependency tree to determine a path along the dependency tree to a service-level action triggered by the first device-level event.

22. The device of claim 16, wherein the rules engine generates a notification of the first service-level impact of the first device-level event to a network service application.

23. The device of claim 16, wherein, when the first device-level event is cleared, the rules engine removes the first data set of dependencies for the first device-level event from the working memory.

24. The device of claim 16, wherein, when the second data set of dependencies includes one or more dependencies from the first data set of dependencies, the rules engine inserts a subset of the second data set of dependencies into the working memory, wherein the subset includes dependencies for the second device-level event that are not in the first data set of dependencies.

25. The device of claim 16, wherein, when the first device-level event is cleared, the rules engine removes one or more dependencies of the first data set of dependencies from the working memory, wherein the removed dependencies are not linked to any other detected device-level events.

26. The device of claim 16, wherein, when the first device-level event and second device-level event are cleared, the rules engine removes one or more dependencies of the first data set of dependencies and the second data set of dependencies from the working memory, and maintains at least one dependency of the first data set of dependencies and the second data set of dependencies in the working memory.

27. The device of claim 26, wherein the rules engine removes the at least one maintained dependency of the first data set of dependencies and the second data set of dependencies according to one of a time-out mechanism or a first-in, first-out (FIFO) mechanism.

28. The device of claim 16, wherein the first device-level event comprises a connectivity failure between a first network device and a second network device, and wherein the first service-level impact of the first device-level event comprises a failure of the network service in the network.

29. The device of claim 16, further comprising a rules database that stores the set of network service rules, wherein the processor is configured to execute a network service application to install the set of network service rules in the rules database, and provision the network service across the one or more network devices in the network.

30. The device of claim 16, wherein the network service comprises one of a point-to-point service, a point-to-multi-point service, or a mesh service across the one or more network devices.

31. The device of claim 16, wherein the network service comprises one of a virtual private network (VPN) or a virtual local area network (VLAN) across the one or more network devices.

32. A non-transitory computer-readable medium comprising instructions that when executed cause a processor of a network service manager device to:
- monitor a network service at one or more network devices in a network to detect a device-level event;
- in response to detecting a first device-level event, insert a first data set of dependencies for the first device-level event into a working memory, wherein the first data set of dependencies inserted in the working memory comprises a first subset of a plurality of dependencies for the network service, and wherein the first data set of dependencies defines links between the first device-level event and actions triggered by the first device-level event;
- apply a set of network service rules to the first data set of dependencies inserted in the working memory to determine a first service-level impact of the detected first device-level event;
- in response to detecting a second device-level event, insert a second data set of dependencies for the second device-level event into the working memory, wherein the second data set of dependencies inserted in the working memory comprises a second subset of the plurality of dependencies for the network service; and
- apply the set of network service rules to the second data set of dependencies inserted in the working memory to determine a second service-level impact of the second device-level event.

* * * * *